(12) United States Patent
Siegel et al.

(10) Patent No.: US 8,617,628 B2
(45) Date of Patent: Dec. 31, 2013

(54) SPHERICAL CORE-SHELL-PARTICLE

(75) Inventors: Sven Siegel, Höxter (DE); Christian Schütte, Holzminden (DE); Frank Ott, Holzminden (DE)

(73) Assignee: Symrise AG, Holzminden (DE)

( * ) Notice: Subject to any disclaimer, the term of this patent is extended or adjusted under 35 U.S.C. 154(b) by 245 days.

(21) Appl. No.: 12/896,014

(22) Filed: Oct. 1, 2010

(65) Prior Publication Data

US 2011/0081451 A1  Apr. 7, 2011

(30) Foreign Application Priority Data

Oct. 1, 2009 (EP) .................. 09 172 011.0-2102

(51) Int. Cl.
*A23L 1/00* (2006.01)
*A23L 1/29* (2006.01)

(52) U.S. Cl.
USPC ............................................ 426/89; 426/443

(58) Field of Classification Search
USPC .................................................. 426/89, 443
See application file for complete search history.

(56) References Cited

U.S. PATENT DOCUMENTS

| 6,986,907 B2 | 1/2006 | Phillips et al. |
| 2002/0188019 A1 | 12/2002 | Ley et al. |
| 2004/0191366 A1* | 9/2004 | Mangos et al. .................. 426/89 |

FOREIGN PATENT DOCUMENTS

| DE | 102004041496 A1 | 3/2006 |
| EP | 1775071 A1 | 4/2007 |
| WO | WO-9302785 A1 | 2/1993 |
| WO | WO-9815191 A1 | 4/1998 |
| WO | WO-9815192 A1 | 4/1998 |
| WO | WO-03055587 A1 | 7/2003 |
| WO | WO-2005077521 A1 | 8/2005 |
| WO | WO-2005096841 A1 | 10/2005 |
| WO | WO-2006/003107 A1 | 1/2006 |
| WO | WO-2006058893 A2 | 6/2006 |
| WO | WO-2006106023 A1 | 10/2006 |
| WO | WO-2007003527 A1 | 1/2007 |
| WO | WO-2007019882 A1 | 2/2007 |
| WO | WO-2007019883 A1 | 2/2007 |
| WO | WO-2007045566 A1 | 4/2007 |
| WO | WO 2008012329 A2 * | 1/2008 |

OTHER PUBLICATIONS

Evonic industries AG Product information of SIPERNAT 50S, Feb. 2012, pp. 2.*
Anonymous: "Specifications for the TA.XT2 Texture Analyser", Jan. 1, 2013, pp. 1-5, XP055057218, Retrieved from the Internet: URL:http://128.121.92.221/TAXT2_Texture_Analyzer.htm [retrieved on Mar. 20, 2013].
Anonymous: "Breaking-force tests for empty and filled hard capsules and softgels", Jan. 1, 2012, pp. 1-2, XP055057221, Retrieved from the Internet: URL:http://www.pharmatron.ch/neuigkeiten/publications/breaking-force-tests-for-empty-and-filled-hard-capsules-and-softgels/ [retrieved on Mar. 20, 2013].
Examination Report, European Application No. 09172011.0.

* cited by examiner

*Primary Examiner* — Jyoti Chawla
(74) *Attorney, Agent, or Firm* — Novak Druce Connolly Bove + Quigg LLP

(57) ABSTRACT

The invention relates to a spherical core-shell-particle comprising or consisting of the following components:
(a) a core consisting of or comprising
  (a1) a core liquid,
(b) a hardened shell surrounding the core, the shell consisting of or comprising
  (b1) a hardened polysaccharide or a hardened mixture of polysaccharides,
  (b2) one, two or more water soluble fillers, and
  (b3) a hardness increasing amount of one, two or more water insoluble fillers and, optionally,
(c) a coating layer.

16 Claims, No Drawings

SPHERICAL CORE-SHELL-PARTICLE

CROSS-REFERENCE TO RELATED APPLICATIONS

This application claims priority under 35 U.S.C. §119(a) to European Application No. 09 172 011.0-2102, filed Oct. 1, 2009, the entire contents of which is hereby incorporated by reference.

The present invention relates to a spherical core-shell-particle comprising or consisting of a core consisting of or comprising a core liquid and a hardened shell surrounding the core, the shell consisting of or comprising a hardened polysaccharide or a hardened mixture of polysaccharides, one, two or more water soluble fillers, and a hardness increasing amount of one, two or more water insoluble fillers and, optionally, a coating layer. The invention also relates to a method of preparing such particles. The invention further relates to the use of water insoluble solid particles as a filler for reinforcing the shell of the core-shell-particle and a preparation comprising a plurality of the before mentioned core-shell particles.

Flavourings are used in foods in order to achieve taste impressions. In the sense of the present invention a flavouring is to be understood to be a single substance or a mixture of substances having organoleptic properties. These organoleptic properties include the characteristics of imparting a specific odour or taste or give rise to specific stimuli, which are transmitted via the trigeminus nerve and are thus detected.

Oils, such as, for example, vegetable oils and other triglycerides, which are used as solvents for the flavouring and themselves have a neutral odour and taste are not regarded as flavourings herein below.

If flavourings are to be ingested by a consumer in portions in the form of a liquid, the use of a capsule in which a core of a quantity of liquid containing flavouring is surrounded by a solid shell is a common measure.

In the state of the art core-shell particles especially to be used for flavouring purposes are made e.g. from alginate or from gelatine. Core-shell-particles (capsules) made from alginate according to the state of the art have the disadvantage that they can be broken by a relative small breaking force of <2 N. This results in a relative high breaking rate especially in uses with a higher mechanical stress so e.g. in chewing gums. Breakage can occur also during transportation of the core-shell-particles or during processing like mixing of the particles into food products. Breakage of the shell will result that the core is set free so that the wished flavouring effect can not be controlled or there are losses of flavouring material.

As alternative in state of the art there are used core-shell particles (capsules) having a shell made from gelatine which are more resistant against breakage caused by mechanical stress. However, gelatine has the disadvantage that it is from animal origin so that groups of consumers may refuse such a material because of religious reasons or because they prefer to live on vegetarian food only.

Spherical capsules having a liquid core and a solid shell surrounding this core are known and capsules can, for example, be prepared by the rotary die method or, in the case of the capsules having a seamless shell, which are of particular interest, by a drip method using a multi-component nozzle (cf. Bauer, Frömming, Führer; Pharmazeutische Technologie; 1997). In the context of this text (insofar as nothing different results from the context) references to the multi-component nozzle method are also to be understood as references to a multiplicity of related methods for the preparation of seamless coating-free capsules.

For example, in the multi-component nozzle method capsules having a seamless shell are prepared by a drip method. With this method a core material and a shell solution preferably comprising a monovalent cation comprising salt of an acid polysaccharide are usually simultaneously pumped through a concentric multi-component nozzle so that they drip into a hardening solution preferably comprising bivalent cations. Preferably the nozzles are not dipped into the hardening solution. When they drip in the capsules assume a ball shape (spherical shape) as a result of the surface tensions. As a result of the reaction with the hardening solution the seamless capsule shell solidifies. The capsule shell forms an intact layer, completely surrounding the core material.

A primary aim of the present invention was to indicate spherical capsules (core-shell-particle) of the initially mentioned type that are suitable for flavouring foods, especially releasing the core immediately by biting onto the capsule (flavour burst) wherein the shell material is of a non-animal origin and shows an improved resistance against mechanical stress. In addition a pleasant mouthfeel should be experienced when consuming the spherical capsule. In addition, a method of preparation for the capsules that is practicable on an industrial scale was to be indicated.

According to the invention the above problem is solved by providing a spherical core-shell-particle comprising or consisting of the following components:
(a) a core consisting of or comprising
  (a1) a core liquid
(b) a hardened shell surrounding the core, the shell consisting of or comprising
  (b1) a hardened polysaccharide or a hardened mixture of polysaccharides,
  (b2) one, two or more water soluble fillers, and
  (b3) a hardness increasing amount of one, two or more water insoluble fillers and, optionally,
(c) a coating layer.

EP 1775071, WO 2007/019882, WO 2007/0198883 and WO 2005/077521 disclose the use of silica in combination with core-shell-particles. However, silica is only used on the shell as an antitacing agent. In these documents gelatine or aligante are disclosed as main component of the shell material. However, if the alginate it is used the preferred hardness disclosed in e.g. WO 2007/019882 usually is not achieved.

In WO 98/015191 and WO 98/15192 there is silica mentioned as release modificator for the shell material. However, these documents do not give a hind on an hardness improvement caused by this material especially in combination with soluble fillers like polyalcohols.

Surprisingly, the inventors where able to show that it is possible to increase the hardness and thereby the resistance against mechanical stress of the shell material by adding one, two or more water insoluble fillers in combination with one, two or more water soluble fillers. In the context of the present application, a compound having a water solubility (at 20° C.) of less than 1.5 g/l, preferably less than 1 g/l, more preferably less than 0.7 g/l, even more preferably less than 0.5 g/l and most preferably less than 0.3 g/l is referred to as "water-insoluble".

Preferred embodiments of the present invention are described in the following part of the description and the attached claims.

"Hardness" according this text means the ability of resistance against mechanical stress. Accordingly, the hardness of the shell of the core-shell-particle according to the invention can be determined by measuring the breaking force that is necessary to break the shell Independed of the definition of "hardness" the meaning of "hardened polysaccharide" in this text is a polysaccharide which origins from a polysaccharide that has been liquid or in a liquid solution ("hardenable") before it has been hardened. Preferably the liquid or liquid solution is gelled and particularly preferred the liquid or liquid solution is gelled and dried to form a hardenend polysaccharide insoluble in water.

Throughout the present description a spherical particle has a ratio between the largest and the smallest diameter of the particle of not more than 1.2. This arithmetic mean of the largest and the smallest diameter of the coating-free capsule is designated as the diameter of a coating-free capsule according to the invention.

Unless indicated otherwise, all percentages and ratios given are by weight and all conditions (e.g. state of aggregation) refer to 20° C.

Capsule Size

The capsule size (diameter) is preferably in the range of about 0.5 mm to about 12 mm, preferably from 0.7 mm to 9 mm, particularly preferred from 0.7 mm to 5 mm.

Core/Shell Ratio

The mass ratio (weight/weight) of core to shell of the uncoated capsule is preferably from 10:1 to 0.5:1, more preferably from 6:1 to 1:1 and most preferably from 4.5:1 to 2:1.

Shell Thickness:

For not giving a negative mouthfeel of the shell of a capsule (as part of the particles of the present invention) in the mouth the shell thickness should be as small as possible. For a constant core/shell mass ratio the shell thickness increases substantially with increasing diameter of the coating-free capsule.

The capsules preferably have a shell thickness of only 30 μm-200 μm. In these capsules according to the invention the ratio of shell thickness to capsule diameter is in the range of 0.004-0.04. These data relate to the dried capsule. The coating-free capsule diameter can be determined using a micrometer screw. For determination of the shell thickness a cross-section of the coating-free capsule is prepared. The thickness of the shell can be determined via a microscope with image processing. To this end the thickness of the shell is measured at various points in the latter and the mathematical mean for the shell thickness is determined.

With the composition of the shell selected in accordance with the invention (in this context see below) high process and transport stability, adequate elasticity, good biteability are ensured. Although the capsules have an unsoluble shell, the mouthfeel is not negatively influenced.

Composition of the Shell:

A hardened polysaccharide in the sense of this text is a polysaccharide which is gained from a hardenable polysaccharide. Preferred hardenable polysaccharides are acid polysaccharides comprising monovalent cations. Preferred hardened polysaccharides (component b1) are selected from the group consisting of hardened alginates, pectines, xanthan gum, carrageen, agar-agar, and hardened mixtures thereof.

A preferred spherical core-shell particle according to the invention comprises as component b1 in its hardened shell a hardened polysaccharide which is the product of a hardening process which involves contacting of divalent or polyvalent cations with the respective hardenable polysaccharide or polysaccharides. Reference for the hardening process is made e.g. to the WO 93/02785 A1.

It is preferred according to the invention that the or at least one or each water soluble filler (component b2) is a sugar alcohol.

Preferred sugar alcohols are selected from the group consisting of sorbitol, mannitol, xylitol, erythritol, maltitol, lactitol, and mixtures thereof, preferably sorbitol, xylitol, or mixtures thereof.

Preferred is a core-shell particle according to the invention wherein the at least one or each water insoluble filler (component b3) is selected from the group consisting of silicon dioxide, calcium phosphates, cellulose, titanium dioxide, iron(III) oxide-hydroxide, particular $FeO(OH).H_2O$, iron(III) oxide, iron(II,III) oxide, magnesium phosphate, aluminium hydroxide, aluminium silicate, magnesium silcate, hydrated magnesium silicate $H_2Mg_3(SiO_3)_4$ or $Mg_3Si_4O_{10}(OH)_2$, magnesium trisilicate, magnesium aluminium silicate, sodium aluminium silicate, potassium aluminium silicate calcium aluminium silicate, and bentonite.

The preferred water insoluble filler is silicon dioxide.

These water insoluble fillers are especially capable of improving the hardness of the shell.

It is preferred that at least one or each water insoluble filler (component b3) consists of particles having an average particle size of ≤100 μm, preferably 1 nm to 100 μm, more preferably 1 nm to 1000 nm, in particular preferably 1 nm to 100 nm and most preferably 5 to 20 nm.

It is further preferred that the particles of the or at least one or of each water insoluble filler (component b3) are dispersed homogeneously within the shell, wherein in preferably at the same time the particles of one, two, several or all fillers are dispersed homogeneously within the shell and have an average particle size of ≤100 μm, preferably 1 nm to 100 μm, more preferably 1 nm to 1000 nm, in particular preferably 1 nm to 100 nm and most preferably 5-20 nm.

Preferable the particle size is measured bear the aperture HORBIA LB 550, supplier Retsch Technology; range of the measurement 1 nm to 6000 nm this measurement is based on dynamic light skattering, the particle size is determent via Fourier transformation.

It is preferred that the spherical core-shell particle according to the invention comprises a hardened shell which is seemless and/or wherein the core is mono nuclear. These, features improve the mechanical stress resistance of the particles according to the invention.

An specially preferred core-shell particle according to the invention is a particle, wherein the or at least one hardened polysaccharide of component (b1) is selected from the group consisting of hardened alginates, pectines, xanthan gum, carrageen, agar-agar, and hardened mixtures thereof, and the or at least one or each water soluble filler of component (b2) is a sugar alcohol, and the or at least one or each water insoluble filler of component (b3) is selected from the group consisting of silicon dioxide, calcium phosphate, cellulose, titanium dioxide, iron(III) oxide-hydroxide, particular $FeO(OH).H_2O$, iron(III) oxide, iron(II,III) oxide, magnesium phosphate, aluminium hydroxide, aluminium silicate, magnesium silcate, hydrated magnesium silicate $H_2Mg_3(SiO_3)_4$ or $Mg_3Si_4O_{10}(OH)_2$, magnesium trisilicate, magnesium aluminium silicate, sodium aluminium silicate, potassium aluminium silicate calcium aluminium silicate, and bentonite.

Most preferred as hardenable polysaccharide for preparing the spherical core-shell particle according to the invention is sodium alginate. It is further preferred to contact during preparation of the particles according to the invention a polysaccharide comprising mono valent cations (like the preferred sodium alignate) with divalent cations (preferred $Ca^{2+}$)

during the hardening process so that the hardened polysaccharide comprises Ca-alginate).

A Core-shell particle according to the invention preferably comprises the ratio of total weights of components (b1):(b2): (b3) in the range of from 1:0.1:0.1 to 1:0.5:0.5 preferably from 1:0.2:0.2 to 1:0.4:0.4 and particularly from 1:0.25:0.25 to 1:0.35:0.35.

Surprisingly the inventors have found that within the preferred ratios the components b1 to b3 contribute to the hardening in a synergistical manner: the hardening effect in the shell is bigger than the addition of the hardening effect expected by each of the three components.

A preferred core-shell particle according to the invention further comprises in component (b) one, two, several or all additives selected from the group consisting of emulsifiers, colourings, antioxidants, sweeteners, and neutraceuticals.

In addition to components b1-b3, the shell of the particle according to the invention can contain sweeteners, such as, for example, sucralose, aspartame, acesulfame, K or Na saccharine, thaumatin, neohesperidin, or mixtures thereof, as well as food colourants.

In addition to the materials mentioned above, the shell can contain acids, in particular of the monoacid, diacid or triacid type, preferably citric acid, fumaric acid, malic acid, succinic acid, tartaric acid, adipic acid, ascorbic acid, lactic acid or acetic acid. The use of at least one such acid makes it possible, in particular, to ensure microbiological stability of the shell of the coating-free capsule and to tailor its sensory properties. In addition the physicochemical properties can be adjusted (pH,).

The particles according to the invention can further comprise breath control actives, suitable for inclusion in the shell of the coating-free capsules are quaternary compounds such as pyridinium salts (e.g., cetyl pyridinium chloride), other cationic materials such as chlorhexidine salts, zinc salts, salts such as sodium laurate, chlorophyll, triclosan, copper compounds such as copper gluconate or copper-chlorophyll-extract.

Core Liquid:

In a preferred core-shell particle according to the invention the component (a1) is constituted by a liquid solution, emulsion or dispersion of one or more ingredients in a solvent or outer phase, respectively. According to the invention it is further preferred that component (a) comprises as ingredients of component (a1) and/or as ingredients of a separate component (a2) one, two or more substances selected from the group consisting of flavors, fragrances, solvents, diluents, sweeteners, and optionally one, two or more substances selected from the group consisting of coloring agents, vitamins, vegetable extracts, thickening agents, weightening agents, pH-modifiers, antioxidants, emulsifiers, nutritionals, taste modifiers and microorganisms.

In general the core liquid in the core-shell-particle (seamless or not) can be liquid or viscous. Preferably the core liquid has a viscosity of 1 to 500 mPas, more preferably of 5 to 300 mPas, even more preferably of 7 to 200 mPas and most preferably 11 to 99 mPas determined in rotation at 25° C. at a shear force of $10\,s^{-1}$ using a 50 mm plate-plate probe unit, e.g. one like that used in Bohlin CVO 100.

On consumption of the particle according to the invention a amount of core liquid passes directly into the mouth. This typically gives rise to an immediate flavour impression (flavour burst), especially when chewing or biting causes rupture of the shell of the coating-free capsule. The impact of said flavour impression can be adjusted by type and/or amount of flavouring in the core liquid.

Therefore, mixtures of flavourings with vegetable oils or triglycerides are preferably used for the core liquid. The mixture is preferably a clear solution at room temperature and preferably also still a clear solution 10° C. Examples of suitable flavourings are synthetic and natural flavourings and mixtures thereof as well as also oleoresins or extracts of plants, leaves, flowers, fruit and the like, as well as combinations thereof.

Flavors

Preferably the flavor used according to the invention comprises lipophilic flavor substances.

Lipophilic flavoring substances are preferably used in the context of the present invention and thus preferably used in the core of the capsule according to the invention. They belong to various chemical groups, such as for example:

the group comprising hydrocarbons, such as for example 3-carene; α-pinene; β-pinene; α-terpinene; γ-terpinene; p-cymol; bisabolene; camphene; caryophyllene; cedrene; farnesene; limonene; longifolene; myrcene; ocimene; valencene; (E,Z)-1,3,5-undecatrien;

the group comprising aliphatic alcohols, such as for example: hexanol; octanol; 3-octanol; 2,6-dimethylheptanol; 2-methyl-2-heptanol; 2-methyl-2-octanol; (E)-2-hexenol; (E)- and (Z)-3-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

the group comprising aliphatic aldehydes and the acetals thereof such as for example: hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-5,9-undecadienal; heptanal diethylacetal; 1,1-dimethoxy-2,2,5-trimethyl-4-hexene;

the group comprising aliphatic ketones and oximes thereof, such as for example: 2-heptanone; 2-octanone; 3-octanone; 2-nonanone; 5-methyl-3-heptanone; 5-methyl-3-heptanone oxime; 2,4,4,7-tetramethyl-6-octen-3-one; aliphatic sulfur-containing compounds such as for example: 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthen-8-thiol;

the group comprising aliphatic nitriles, such as for example: 2-nonenoic acid nitrile; 2-tridecenoic acid nitrile; 2,12-tridecadienoic acid nitrile; 3,7-dimethyl-2,6-octadienoic acid nitrile; 3,7-dimethyl-6-octenoic acid nitrile;

the group comprising aliphatic carboxylic acids esters such as for example: (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl-2-methyl pentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyloxyacetate; methyl-3,7-dimethyl-2,6-octadienoate;

the group comprising acyclic terpene alcohols such as for example: citronellol; geraniol; nerol; linalool; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2, 5,7-octatrien-1-ol; and the formates, acetates, propionates, isobutyrates, butyrates, isovalerates, pentanoates, hexanoates, crotonates, tiglinates, 3-methyl-2-butenoates thereof;

the group comprising acyclic terpene aldehydes and ketones such as for example: geranial; neral; citronellal; 7-hydroxy-3,7-dimethyloctanal; 7-methoxy-3,7-dimethyloctanal; 2,6,10-trimethyl-9-undecenal; geranyl acetone; and the dimethyl and diethyl acetals of geranial, neral, 7-hydroxy-3,7-dimethyloctanal;

the group comprising cyclic terpene alcohols such as for example: menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; and the formates, acetates, propionates, isobutyrates, butyrates, isovalerates, pentanoates, hexanoates, crotonates, tiglinates, 3-methyl-2-butenoates thereof;

the group comprising cyclic terpene aldehydes and ketones such as for example: menthone; isomenthone; 8-mercaptomenthan-3-one; carvone; camphor; fenchone; alpha-ionone; beta-ionone; alpha-n-methyl ionone; beta-n-methyl ionone; alpha-isomethyl ionone; beta-isomethyl ionone; alpha-irone; alpha-damascone; beta-damascone; beta-damascenone; delta-damascone; gamma-damascone; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H—)-one; nootkatone; dihydronootkatone; alpha-sinensal; beta-sinensal;

the group comprising cyclic alcohols such as for example: 4-tert.-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

the group comprising cycloaliphatic alcohols such as for example: alpha-3,3-trimethylcyclohexylmethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

the group comprising esters of cycloaliphatic carboxylic acids such as for example: allyl-3-cyclohexyl propionate; allylcyclohexyl oxyacetate; methyldihydrojasmonate; methyl jasmonate; methyl-2-hexyl-3-oxocyclopentane carboxylate; ethyl-2-ethyl-6,6-dimethyl-2-cyclohexene carboxylate; ethyl-2,3,6,6-tetramethyl-2-cyclohexene carboxylate; ethyl-2-methyl-1,3-dioxolane-2-acetate;

the group comprising aromatic hydrocarbons, such as for example styrene and diphenylmethane;

the group comprising araliphatic alcohols such as for example: benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

the group comprising esters of araliphatic alcohols and aliphatic carboxylic acids such as for example: benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethylacetate; alpha-trichloromethylbenzyl acetate; alpha,alpha-dimethylphenylethyl acetate; alpha, alpha-dimethylphenylethyl butyrate; cinnamyl acetate; 2-phenoxyethyl isobutyrate; 4-methoxybenzyl acetate; araliphatic ethers such as for example: 2-phenylethyl methyl ether; 2-phenyl ethyl isoamyl ether; 2-phenyl ethyl-1-ethoxyethyl ether; phenylacetaldehyde dimethylacetal; phenylacetaldehyde diethylacetal; hydratropaldehyde dimethylacetal; phenylacetaldehyde glycerol acetal;

the group comprising aromatic and araliphatic aldehydes such as for example: benzaldehyde; phenylacetaldehyde; 3-phenylpropanal; hydratropaldehyde; 4-methylbenzaldehyde; 4-methylphenylacetaldehyde; 3-(4-ethylphenyl)2,2-dimethylpropanal; 2-methyl-3-(4-isopropylphenyl)propanal; 2-methyl-3-(4-tert.-butylphenyl)propanal; 3-(4-tert.-butylphenyl)propanal; cinnamaldehyde; alpha-butylcinnamaldehyde; alpha-amylcinnamaldehyde; alpha-hexylcinnamaldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

the group comprising aromatic and araliphatic ketones such as for example: acetophenone; 4-methylacetophenone; 4-methoxyacetophenone; 4-tert.-butyl-2,6-dimethylacetophenone; 4-phenyl-2-butanone; 4-(4-hydroxyphenyl)-2-butanone; 1-(2-naphthalenyl)ethanol; benzophenone;

the group comprising aromatic and araliphatic carboxylic acids and the esters thereof such as for example: benzoic acid; phenylacetic acid; methyl benzoate; ethyl benzoate; hexyl benzoate; benzyl benzoate; methylphenyl acetate; ethylphenyl acetate; geranylphenyl acetate; phenylethylphenyl acetate; methyl cinnamate; ethyl cinnamate; benzyl cinnamate; phenylethyl cinnamate; cinnamyl cinnamate; allyl phenoxy acetate; methyl salicylate; isoamyl salicylate; hexyl salicylate; cyclohexyl salicylate; cis-3-hexenyl salicylate; benzyl salicylate; phenylethyl salicylate; methyl-2,4-dihydroxy-3,6dimethylbenzoate; ethyl-3-phenylglycidate; ethyl-3-methyl-3-phenyl glycidate;

the group comprising nitrogenous aromatic compounds such as for example: 2,4,6-trinitro-1,3-dimethyl-5-tert.-butylbenzene; 3,5-dinitro-2,6-dimethyl-4-tert.-butyl acetophenone; cinnamonitrile; 5-phenyl-3-methyl-2-pentenoic acidnitrile; 5-phenyl-3-methylpentanoic acid nitrile; methyl anthranilate; methyl-N-methyl anthranilate; Schiff bases of methyl anthranilate with 7-hydroxy-3,7-dimethyloctanal, 2-methyl-3-(4-tert.-butylphenyl)propanal or 2,4-dimethyl-3-cyclohexenecarbaldehyde; 6-isopropyl quinoline; 6-isobutyl quinoline; 6-sec.-butyl quinoline; indole; skatole; 2-methoxy-3-isopropylpyrazine; 2-isobutyl-3-methoxypyrazine;

the group comprising phenols, phenyl ethers and phenyl esters such as for example: estragole; anethole; eugenol; eugenyl methyl ether; isoeugenol; isoeugenyl methyl ether; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl)phenol; p-cresyl phenyl acetate;

the group comprising heterocyclic compounds such as for example: 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

the group comprising lactones such as for example: 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 1,15-pentadecanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene 1,12-dodecanedioate; ethylene 1,13-tridecanedioate; coumarin; 2,3-dihydrocoumarin; octahydrocoumarin. The lipophilic flavoring substances particularly preferably used in the context of the present invention have a log $P_{OW}$ of higher than 1.0 are preferably selected from the group consisting of:

acetophenone, allyl capronate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymol, damascone, decalactone, dihydrocoumarin, dimethyl anthranilate, dimethyl anthranilate, dodecalactone, ethoxyethyl acetate, ethylbutyric acid, ethyl butyrate, ethyl caprinate, ethyl capronate, ethyl crotonate, ethyl furaneol, ethyl guajacol, ethyl isobutyrate, ethyl isovalerate, ethyl lactate, ethyl methyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. hedione), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl capronate, trans-2-hexenyl capronate, cis-3-hexenyl formate, cis-2-hexyl acetate, cis-3-hexyl acetate, trans-2-hexyl acetate, cis-3-hexyl formate, para-hydroxy benzyl acetone, isoamyl alcohol, isoamyl isovalerate, isobutyl butyrate, isobutyraldehyde, isoeugenol methyl ether, isopropylmethylthiazole, lauric acid, levulinic acid, linalool, linalool oxide, linalyl acetate, menthol, menthofuran, methyl anthranilate, methylbutanol, methylbutyric acid, 2-methylbutyl acetate, methyl capronate, methyl cinnamate, 5-methyl furfural, 3,2,2-methyl cyclopentenolone, 6,5,2-methyl heptenone, methyl dihydrojasmonate, methyl jasmonate, 2-methyl methyl butyrate, 2-methyl-2-pentenoic acid, methylthiobutyrate, 3,1-methylthiohexanol, 3-methylthiohexyl acetate, nerol, neryl acetate, trans,trans,2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl alcohol, phenylethyl isovalerate, piperonal, propionaldehyde, propyl butyrate, pulegone, pulegol, sinensal, sulfurol, terpinene, terpineol, terpinolene, 8,3-thiomenthanone, 4,4,2-thiomethyl pentanone, thymol, delta-undecalactone, gamma-undecalactone, valencene, valeric acid, vanillin, acetoin, ethyl vanillin, ethyl vanillin isobutyrate (=3-ethoxy-4-isobutyryloxybenzaldehyde), 2,5-dimethyl-4-hydroxy-3(2H)-furanone and the derivatives thereof (in this case preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (in this case preferably ethyl maltol), coumarin and coumarin derivatives, gamma-lactones (in this case preferably gamma-undecalactone, gamma-nonalactone, gamma-decalactone), delta-lactones (in this case preferably 4-methyl delta decalactone, massoia lactone, delta decalactone, tuberose lactone), methyl sorbate, divanillin, 4-hydroxy-2(or 5)-ethyl-5(or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methylbutyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenyl glycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulfide, furfuryl mercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, mercapto-3-methyl-1-butanol, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guajacol, 3-hydroxy-4,5-dimethyl-2(5H)-furanone, 3-hydroxy-4-methyl-5-ethyl-2(5H)-furanone, cinnamaldehyde, cinnamyl alcohol, methyl salicylate, isopulegol and further stereoisomers, enantiomers, positional isomers, diastereomers, cis/trans-isomers or epimers (not expressly mentioned) of these substances.

Flavourings from the series comprising peppermint oils, spearmint oils, eucalyptus oils, wintergreen oils, cinnamon oils, cassia oils, aniseed oils, bitter almond oils, clove oils, parsley seed oils, citrus oils, vanilla (extracts), fruity flavouring compositions having tastes oriented towards, for example, apple, pear, peach, grape, strawberry, raspberry, cherry or pineapple are preferably used.

In addition, suitable individual substances as part of the flavourings are those having a cooling refreshing effect in the throat or in the oral or nasal cavity. Those which may be mentioned, by way of example, are menthol, menthone, carboxamides, menthol acetate, menthol methyl ether, methone acetals, menthol carbonates, menthol succinates, 1,8-cineol (eucalyptol), carvone, alpha-terpineol, thymol, methyl salicylate, 2'-hydroxypropiophenone.

Flavouring Content in the Liquid or Viscous Core:

The flavouring content in the core liquid depends, in particular, on the particle size and the flavouring intensity and according to the invention ranges from 1-100%, based on the total mass of the liquid or viscous core. However, a flavouring content in the liquid or viscous core in the range of 5-100% (m/m), preferably 30-95% (m/m), based on the total mass of the liquid or viscous core, is preferred.

Sweeteners in the Liquid or Viscous Core (Optional):

Sweeteners can also be added to the core liquid of a particle according to the invention, with the use of solubilising agents if appropriate. Since, in accordance with the invention, the core liquid comes into direct contact with the teeth in the mouth, it is advantageous if the core liquid does not exert a pH-lowering action. Otherwise it would not be possible to preclude damage to the enamel.

In the Applicant's research it has now been found that thaumatin, neohesperidine and miraculin (as well as mixtures thereof) are particularly suitable as sweeteners in the core liquid and do not have an adverse effect on the pH value. On solubility grounds thaumatin is particularly preferred.

In general applicable sweeteners for the core material are also saccharin (optionally as Na, K or Ca salt), aspartame (for example NutraSweet®), cyclamate (optionally as Na or Ca salt), acesulfam-K (for example Sunett®), -dihydrochalcone. Furthermore, other sweeteners, such as stevioside, rebaudioside A, glycyrrhizin, ultrasweet, osladin, brazzein, miraculin, pentadin, phyllodulcin, dihydrochalcone, arylureas, trisubstituted guanidines, glycyrrhizin, superaspartam, suosan, sucralose (trichlorogalactosesucrose, TGS), alitame, monellin or Neotame® can also be used.

It has also been found that, on the other hand, other sweeteners that in principle are suitable for use, such as, for example, saccharinic acid or acesulfame K lower the pH value of the aqueous phase and therefore in the same cases should not be used in relatively high concentrations if the change in the pH in the mouth is to remain tolerable.

Solvents

Preferably a core-shell-particle according to the invention comprises in the core flavoring solvents. Preferred flavoring solvents are suitable for human consumption, e.g. ethanol, fatty oils, such as cooking oils and in particular vegetable oils such as for example borage oil, thistle oil, groundnut oil, hazelnut oil, coconut oil, pumpkin seed oil, linseed oil, maize germ oil, macadamia nut oil, almond oil, olive oil, pecan nut oil, pistachio kernel oil, rapeseed oil, rice germ oil, sesame seed oil, Soya oil, sunflower oil, walnut oil or wheat germ oil, fractionated coconut oils, which mainly have fatty acid residues with a length of between six and eight carbon atoms (C6- to C8-fatty acids), propylene glycol, diacetine (glycerine diacetate), triacetine (glycerine triacetat), benzyl alcohol, triethyl citrate, ethyl lactate, isopropanol and glycerine. According to a preferred embodiment the flavoring substances to be used according to the invention are mixed with one or more of the abovementioned flavoring solvents and then fed into the method according the invention. The method according to the invention is described further below.

Further Constituents of the Liquid or Viscous Core:

Colouring substances, antioxidants, vitamins (e.g. ascorbic acid, vitamin E), and/or vegetable extracts can be added to the core liquid.

Preferred colorants are lactoflavin (riboflavin), beta-carotene, riboflavin-5'-phosphate, alpha-carotene, gamma-carotene, cantaxanthin, erythrosine, curcumin, quinoline yellow, yellow orange S, tartrazine, bixin, norbixin (annatto, orlean), capsanthin, capsorubin, lycopene, beta-apo-8'-carotenal, beta-apo-8'-carotenic acid ethyl ester, xantophylls (flavoxanthin, lutein, cryptoxanthin, rubixanthin, violaxanthin, rodoxanthin), fast carmine (carminic acid, cochineal), azorubin, cochineal red A (Ponceau 4 R), beetroot red, betanin, anthocyanins, amaranth, patent blue V, indigotine I (indigo-carmine), chlorophylls, copper compounds of chlorophylls, acid brilliant green BS (lissamine green), brilliant black BN, vegetable carbon, titanium dioxide, iron oxides and hydroxides, calcium carbonate, aluminum, silver, gold, pigment rubine BK (lithol rubine BK), methyl violet B, victoria blue R, victoria blue B, acilan brilliant blue FFR (brilliant wool blue FFR), naphthol green B, acilan fast green 10 G (alkali fast green 10 G), ceres yellow GRN, sudan blue II, ultramarine, phthalocyanine blue, phthalocayanine green, fast acid violet R. Further naturally obtained extracts (for example paprika extract, black carrot extract, red cabbage extract) can be used for coloring purposes. Goods results are also achieved with the colors named in the following, the so-called aluminum lakes: FD & C Yellow 5 Lake, FD & C Blue 2 Lake, FD & C Blue 1 Lake, Tartrazine Lake, Quinoline Yellow Lake, FD & C Yellow 6 Lake, FD & C Red 40 Lake, Sunset Yellow Lake, Carmoisine Lake, Amaranth Lake, Ponceau 4R Lake, Erythrosyne Lake, Red 2G Lake, Allura Red Lake, Patent Blue V Lake, Indigo Carmine Lake, Brilliant Blue Lake, Brown HT Lake, Black PN Lake, Green S Lake and mixtures thereof.

Preferred antioxidants including substances which can reinforce an antioxidative effect are for example naturally occurring tocopherols and derivatives thereof (for example vitamin E-acetate), vitamin C and the salts or derivatives thereof (for example ascorbyl palmitate, Mg-ascorbyl phosphate, ascorbyl acetate), vitamin A and derivatives (vitamin A-palmitate), tocotrienols, flavonoids, alpha-hydroxy acids (for example citric acid, lactic acid, malic acid, tartaric acid) and the Na, Ka and Ca salts thereof, flavonoids, quercetin, phenolic benzylamines, propyl gallate, octyl gallate, dodecyl gallate, butylhydroxyanisol (BHA, E320), butyl hydroxytoluene (BHT, 2,6-di-tert.-butyl-4-methyl-phenol, E321), lecithins, mono- and diglycerides of edible fatty acids esterified with citric acid, carotenoids, carotenes (for example a-carotene, β-carotene, lycopene) and derivatives thereof, phytic acid, lactoferrin, EDTA, EGTA), folic acid and derivatives thereof, ubiquinone and ubiquinol and derivatives thereof, ferulic acid and derivatives thereof, zinc and derivatives thereof (for example ZnO, ZnSO4), selenium and derivatives thereof (for example selenium methionine), orthophosphates and Na, Ka and Ca salts of monophosphoric acid as well as ingredients isolated from plants, extracts or fractions thereof, for example, from tea, green tea, algae, grape seeds, wheatgerm, camomile, rosemary and oregano.

The liquid or viscous core may contain substances or substance mixtures, which are active in nutritional physiology (neutriceuticals). Neutraceuticals in the meaning of the invention are substances or mixtures of substances which add a healthy benefit to the capsules according to the invention. Examples of such substances are especially vitamins, minerals, trace elements, micronutrients, antioxidants. The following might be named by way of example: panthenol, pantothenic acid, essential fatty acids, vitamin A and derivatives, carotenes, vitamin C (ascorbic acid), vitamin E (tocopherol) and derivatives, vitamins of the B and D series, such as vitamin $B_6$ (nicotinamide), vitamin $B_{12}$, vitamin $D_1$, vitamin $D_3$, vitamin F, folic acid, biotin, amino acids, oil soluble compounds of the elements magnesium, silicon, phosphorus, calcium, manganese, iron or copper, coenzyme Q10, unsaturated fatty acids, ω-3-fatty acids, polyunsaturated fatty acids, γ-linolenic acid, oleic acid, eicosapentaenoic acid, docosahexaenoic acid and derivatives thereof, bisabolene, chloramphenicol, caffeine, capsaicin, prostaglandins, thymol, camphor, gamma-oryzanol, salmon oil, oil soluble or oil miscible extracts, concretes or residues of plant and animal origin.

Preferably a core-shell-particle according to the invention further comprises thickening agents and/or weightening agents.

Thickening agents are substances which increase the viscosity, especially of the core, e.g silicone dioxide or ethylcellulose.

Weightening agents are substances suitable to increase the density of the core.

The core-shell-particles (capsules) according to the invention may comprise a cooling substance, preferably in the core. Cooling substances are for instance l-menthol, d-menthol, racemic menthol, menthone glycerol acetal (trade name: Frescolat®MGA), methyl lactate (trade name: Frescolat®ML, menthyl lactate preferably being 1-menthyl lactate, in particular l-menthyl-l-lactate), substituted menthyl-3-carboxamides (for example menthyl-3-carboxylic acid-N-ethylamide), 2-isopropyl-N-2,3-trimethylbutanamide, substituted cyclohexane carboxamides, 3-menthoxypropane-1,2-diol, 2-hydroxyethyl menthyl carbonate, 2-hydroxypropyl menthyl carbonate, N-acetylglycine menthyl ester, isopulegol, hydroxycarboxylic acid menthyl esters (for example menthyl-3-hydroxybutyrate), monomenthyl succinate, 2-mercaptocyclodecanone, menthyl-2-pyrrolidin-5-on-ecarboxylate, 2,3-dihydroxy-p-menthane, 3,3,5-trimethylcyclohexanone glycerol ketal, 3-menthyl-3,6-di- and -trioxaalkanoates, 3-menthyl methoxyacetate and icilin.

Cooling active ingredients which are particularly preferred are as follows: 1-menthol, racemic menthol, menthone glycerol acetal (trade name: Frescolat®MGA), menthyl lactate (preferably 1-menthyl lactate, in particular I-menthyl-I-lactate, trade name: Frescolat®ML), 3-menthoxypropane-1,2-diol, 2-hydroxyethyl menthyl carbonate, 2-hydroxypropyl menthyl carbonate.

Actives in the Liquid or Viscous Core:

Antitussive actives can be added and include e.g. dextromethorphan, chlophedianol, carbetapentane, caramiphen, nosciapine, diphenylhydramine, codeine, hydrocodone, hydromorphone, fominoben and benzonatate.

Oral anesthetic actives can be added and include e.g. phenol, lidocaine, dyclonine, benzocaine, menthol, salicyl alcohol and hexylresorcinol.

Especially preferred core-shell particles according to the invention have shows when the breaking force of the shell is 2.5 N or more, preferably in the range of 2.5 to 20 N, more preferably in the range from 3 to 20 N and most preferably in the range from 4 to 20 N.

Measurement of breaking force can be accomplished by known material testing machines applying compression to the core shell particles and measuring forces. The area of probe of the testing machine contacting the core shell particles is flat and has a larger dimension than the capsule diameter. Breaking force is the force registered at the time the capsule shell breaks, when slowly compression is applied. The breaking force can be measured as shown in example 1.

Part of the invention is also a method of preparing spherical core-shell-particles, preferably core-shell-particles according to the invention, comprising the following steps:
(i) providing
   a core material consisting of or comprising a core liquid,
   a shell material dispersion consisting of or comprising water
   a hardenable polysaccharide or a hardenable mixture of polysaccharides,
   one, two or more fillers dissolved in the water, and
   a hardness increasing amount of one, two or more water insoluble fillers.
a hardening liquid for hardening the hardenable polysaccharide or a hardenable mixture of polysaccharides,
(ii) forming droplets comprising a core and a shell, the core being constituted by the core material and the shell being constituted by the shell material,
(iii) hardening the hardenable polysaccharide or hardenable mixture of polysaccharides in the shell of the droplets by contacting the shell with the hardening liquid, and optionally
(iv) washing and/or drying the spherical core-shell-particles obtained in step (iii).

Preferred materials for use in the method according to the invention are mentioned above. It has to be noted, that all combinations of preferred materials for the core-shell-particles according to the invention can be applied to the method according to the invention as well.

Hardening liquids for preparing spherical core-shell-particles are well known in the state of the art. It is preferred that the hardening liquid to be used in the method according to the invention comprises divalent cations, especially preferred $Ca^{2+}$.

In many cases it is preferred that the shell material dispersion further comprises trisodium citrate, colorants and/or ascorbic acid and/or its salts.

In many cases it is further preferred for the method according to the invention (and also for the particles according to the invention) that there are emulsifieres provided in the core material, the shell material and/or the hardening liquid.

Examples of preferred emulsifiers for use according to the invention are lecithin, propylene glycol alginate, polysorbate 20, polysorbate 40, polysorbate 60, polysorbate 65, polysorbate 80, phosphoglycerides, mono- and diglycerides of fatty acids, sorbitan monostearate, sorbitan monooleate, sorbitan monolaurate, sorbitan tristearate, sorbitan monopalmitate, stearyl tartrate, calcium stearoyl-2-lactylate, sodium stearoyl-2-lactylate, propylene glycol esters of fatty acids, polyglycerol polyricinoleate, polyglycerol esters of fatty acids, sugar glycerides, sugar esters of fatty acids, mixed acetic and tartaric acid esters of mono- and diglycerides of fatty acids, diacetyl tartaric acid esters of mono and diglycerides of fatty acids, tartaric acid esters of mono and diglycerides of fatty acids, citric acid esters of mono and diglycerides of fatty acids, lactic acid esters of mono and diglycerides of fatty acids, acetic acid esters of mono and diglycerides of fatty acids, salts of fatty acids, hydroxypropyl methylcellulose, hydroxypropyl cellulose, ammodium phosphatides, soybean hemicellulose.

More preferred emulsifiers are polysorbate 80 and mono- and diglycerides of fatty acids.

In method according to the invention it may be further preferred to wash the formed capsules, preferably with water, after the capsules have been formed (i.e. that the shell of the shell core particle has been hardened). This will result in removal of residues of the hardening solution. Often this will also effect a decrease of the concentration of the water insoluble filler within the shell.

After forming the capsule and after the optional washing step it is further preferred that the resulting core-shell-particles are dried. Preferably the drying process is preformed until the particle according to the invention contains 2 to 20 wt.-%, preferably 3 to 15 wt.-% and especially preferred 4 to 10 wt.-% water, based on the total weight of the particle (without additional coating).

A preferred method according to the invention is a method, wherein in step (ii) the droplets are formed by ejecting the core material and the shell material simultaneously through a concentric multi-component nozzle.

As mentioned above concentric multi-component nozzles are known from the state of the art.

According to the invention a method is further preferred, wherein
   the hardenable polysaccharide or the hardenable mixture of polysaccharides is hardenable by contacting it with di- or polyvalent cations,
   the hardening liquid comprises di- or polyvalent cations, and
   in step (iii) the hardenable polysaccharide or hardenable mixture of polysaccharides in the shell of the droplets is contacted with the hardening liquid so that the di- or polyvalent cations harden the hardenable polysaccharide or the hardenable mixture of polysaccharides.

By this preferred method according to the invention it is possible to produce core-shell-particles of high quality in an effective way.

Part of the invention is also the use of water insoluble solid particles as a filler for reinforcing the shell of a core-shell-particle which is prepared by hardening a hardenable polysaccharide in the presence of water and a water soluble filler.

Preferred water insoluble solid fillers are described above. As stated above the surprising effect that such water insoluble fillers are able to reinforce the shells of core-shell-particles has not been known from the state of the art.

Part of the invention is further a preparation comprising a plurality of (i) core-shell-particles according to the invention or of (ii) core-shell-particles prepared according to the method of the invention.

In such preparations the advantages of the core-shell-particles of the invention or of the particles made according to the invention can be utilized: the improved hardness of the particles compared to particles made from hardenable polysaccharide only allows an easier handling e.g. by mixing the particles into the preparation and further applications especially such, where more mechanicals stress is exterted on the particles.

According to the invention it is preferred that the preparation is selected from the group consisting of food preparations, cosmetic preparations, cleaning preparations, air refreshener preparations.

Use in Food Preparations

A further aspect of the present invention concerns the use of a the capsules (core-shell-particles) according to the invention, for the flavoring of a food preparation or semi-finished products for nourishment or pleasure.

The present invention also concerns a food preparation or semi-finished product for nourishment or pleasure, comprising a preferably sensorially active quantity of capsules according to the invention.

Preference is for a food preparation or semi-finished product for nourishment or pleasure as described above, wherein the total proportion of capsules according to the invention in relation to the total weight of the food preparation or semi-finished product is in the range 0.001 to 10 Wt %, especially in the range 0.25 to 5 Wt %, particularly preferably in the range 0.5 to 3 Wt %, each referred to the total weight of the preparation.

Food preparations or semi-finished products according to the invention for nourishment or pleasure are preferably chosen from the group comprising:
bakery products (for example bread, dry biscuits, cakes, muffins, waffles, baking mixes, other pastry products), confectionery (for example white, milk or dark chocolates, filled chocolates (for example filled with aromatized fondant mass of the After Eight type), chocolate bars, other bar products, chewing candies, fruit gums, hard-boiled and soft candies, chewing gum, sugar pearls, lollipops), capsules (preferably seamless capsules for direct consumption, preferably with a shell based on gelatin and/or alginate), fat masses (for example fillings for baked goods such as for example biscuit fillings, fatty chocolate fillings, fatty chocolate bar fillings), toppings, alcoholic or non-alcoholic beverages (for example coffee, tea, wine, wine-based beverages, beer, beer-based beverages, liqueurs, spirits, brandies, fruit-based carbonated beverages, isotonic beverages, soft drinks, nectars, fruit and vegetable juices, fruit or vegetable juice preparations), instant beverages or instant powders (for example instant cocoa beverages, instant tea beverages, instant coffee beverages, instant desserts in powder form such as custard powder or jelly), meat products (for example ham, fresh or cured sausage preparations, spiced or marinated fresh or cured meat products), eggs or egg products (for example dried egg powder), cereal products and/or nut products (for example breakfast cereals, cornflakes, oat flakes, muesli, muesli bars, trail mix, sweet popcorn, nut bars, fruit and nut bars, precooked ready rice products), dairy products (for example milk beverages, milk ice cream, yogurt, custard, kefir, curd cheese, soft cheese, hard cheese, dried milk powder, whey, butter, buttermilk, products containing partially or entirely hydrolyzed milk protein), products made from Soya protein or other Soya bean fractions (for example Soya milk and products produced therefrom, preparations containing Soya lecithin, fermented products such as tofu or tempeh or products produced therefrom, Soya sauces), fruit preparations (for example jams, fruit ice cream, fruit sauces, fruit fillings), vegetable preparations (for example ketchup, sauces, dried vegetables, deep-frozen vegetables, precooked vegetables, pickled vegetables, preserved vegetables), snack articles (for example baked or fried potato chips or potato dough products, bread dough products, maize- or peanut-based extrudates), fat- and oil-based products or corresponding emulsions (for example mayonnaise, remoulade, dressings, seasoning preparations), other ready-to-serve meals and soups (for example dried soups, instant soups, precooked soups), spices, seasoning mixtures and in particular powdered seasonings, which are for example used in snack food applications Food preparations or semi-finished products according to the invention for nourishment or pleasure may also be nutritional supplements in the form of capsules, tablets (un-coated and coated tablets, for example coatings resistant to gastric juices), sugar-coated tablets, granules, pellets, mixtures of solids, dispersions in liquid phases, as emulsions, as powders, as solutions, as pastes or as other swallowable or chewable preparations.

Preferably the capsules according to the invention are used in chewing gum. Particularly preferred the capsules according to the invention are used in stripes of chewing gum having a thickness of about 1 mm to 2 mm, preferably 1.3 mm to 1.8 mm.

Preferred food preparations or semi-finished products for nourishment or pleasure are preferably selected from the group comprising:
confectionery such as for example hard candies, chewing gums, fruit gums, chewable candies, sugar-coated (refreshing) lozenges, compressed lozenges, hard caramels, chocolate spreads, candies and chocolate, bakery products such as cakes, wafers and cookies, snacks, instant meals and other instant products (soups, sauces, beverage powders and granules, seasoning mixtures), ice cream, fruit preparations, (marmalades, jams, fruit sauces), desserts (blancmange, jelly), dairy products (quark, yogurt, milk drinks, whey preparations) and cereals (cornflakes, muesli bars). In addition, use is also advantageous in nutritional supplements and pharmaceutical products, such as suckable tablets, throat or cough drops, pharmaceutical powders, tablets or granules.

The snacks according to the invention preferably comprise salty snacks, such as for example potato/corn chips, extrudates, pellets, popcorn, crackers, lye rolls and fried or oven-baked dough products. Capsules according to the invention may be incorporated into a snack article or applied thereto. Incorporation or application may be achieved by means of powdered seasoning, sprayed-on oil slurry, fatty fillings or dough aromatization.

Further constituents which may be used for food preparations or semi-finished products according to the invention serving for nutrition or pleasure are conventional basic and auxiliary substances and additives for foodstuffs or products consumed for pleasure, for example water, mixtures of fresh or processed, plant or animal basic or raw materials (for example raw, roasted, dried, fermented, smoked and/or boiled meat, bone, cartilage, fish, vegetables, fruit, herbs, nuts, vegetable or fruit juices or pastes or mixtures thereof), digestible or indigestible carbohydrates (for example amylose, amylopectin, inulin, xylans, cellulose), natural or hardened fats (for example tallow, lard, palm fat, coconut oil, hardened vegetable fat), oils (for example sunflower oil, peanut oil, corn germ oil, olive oil, fish oil, soy oil, sesame oil), fatty acids or the salts thereof (for example potassium stearate), proteinogenic or non-proteinogenic amino acids and related compounds (for example γ-aminobutyric acid, taurine), peptides (for example glutathione), native or processed proteins (for example gelatin), enzymes (for example peptidases), nucleic acids, nucleotides, taste-correcting agents for unpleasant taste impressions, further taste modulators for further, generally not unpleasant taste impressions, other taste-modulating substances (for example inositol phosphate, nucleotides such as guanosine monophosphate, adenosine monophosphate or other substances such as sodium glutamate or 2-phenoxypropionic acid), emulsifiers (for example lecithins, diacylglycerols, gum Arabic), stabilizers (for example carageenan, alginate), preservatives (for example benzoic acid, sorbic acid), antioxidants (for example tocopherol, ascorbic acid), chelating agents (for example citric acid), organic or inorganic acidulants (for example malic acid, acetic acid, citric acid, tartaric acid, phosphoric acid), bitter substances (for example quinine, caffeine, limonin, amarogentin, humolone, lupolone, catechins, tannins), mineral salts (for example sodium chloride, potassium chloride, magnesium chloride, sodium phosphates), substances preventing enzymatic browning (for example sulfite, ascorbic acid), essential oils, plant extracts, natural or synthetic dyes or coloring pigments (for example carotenoids, flavonoids, anthocyans, chlorophyll and the derivatives thereof), spices, trigeminally active substances or plant extracts containing such trigeminally active substances, cooling active ingredients such as for example menthol, menthol derivatives (for example L-menthol, L-menthyl lactate, L-menthyl glutarate, L-menthyl succinate) or cubebol, synthetic, natural or nature-identical aroma substances or odoriferous substances and odor-correcting agents.

Food preparations or semi-finished products according to the invention serving for nutrition or pleasure preferably additionally contain one or more taste-correcting agents, preferably selected from the following list: nucleotides (for example adenosine 5'-monophosphate, cytidine 5'-monophosphate), or the pharmaceutically acceptable salts thereof, lactisole, sodium salts (for example sodium chloride, sodium lactate, sodium citrate, sodium acetate, sodium gluconate), further hydroxyflavanones (for example eriodictyol, homoeriodictyol or the sodium salts thereof), in particular according to US 2002/0188019, hydroxybenzoic acid amides according to DE 10 2004 041 496 (for example 2,4-dihydroxybenzoic acid vanillylamide, 2,4-dihydroxybenzoic acid N-(4-hydroxy-3-methoxybenzyl)amide, 2,4,6-trihydroxybenzoic acid N-(4-hydroxy-3-methoxybenzyl)amide, 2-hydroxybenzoic acid N-4-(hydroxy-3-methoxybenzyl)amide, 4-hydroxybenzoic acid N-(4-hydroxy-3-methoxybenzyl)amide, 2,4-dihydroxybenzoic acid N-(4-hydroxy-3-methoxybenzyl)amide monosodium salt, 2,4-dihydroxybenzoic acid N-2-(4-hydroxy-3-methoxyphenyl)ethylamide, 2,4-dihydroxybenzoic acid N-(4-hydroxy-3-ethoxybenzyl)amide, 2,4-dihydroxybenzoic acid N-(3,4-dihydroxybenzyl)amide and 2-hydroxy-5-methoxy-N-[2-(4-hydroxy-3-methoxyphenyl)ethyl]amide (aduncamide), 4-hydroxybenzoic acid vanillylamide), bitterness-masking hydroxydeoxybenzoins according to WO 2006/106023 and the documents based thereon (Symrise) (for example 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone), amino acids (for example gamma-aminobutyric acid according to WO 2005/096841 for reducing or masking an unpleasant taste impression such as bitterness), malic acid glycosides according to WO 2006/003107, salty tasting mixtures according to WO 2007/045566, diacetyl trimers according to WO 2006/058893, divanillin, mixtures of whey proteins with lecithins and/or bitterness-masking substances such as gingerdione according to WO 2007/003527.

Food preparations or semi-finished products according to the invention serving for nutrition or pleasure may additionally contain one or more alkamides, preferably selected from the group consisting of: 2E,4E-decadienoic acid N-isobutylamide (pellitorine), 2E,4Z-decadienoic acid N-isobutylamide (cis-pellitorine), 2Z,4Z-decadienoic acid N-isobutylamide, 2Z,4E-decadienoic acid N-isobutylamide, 2E,4E-decadienoic acid N-([2S]-2-methylbutyl)amide, 2E,4E-decadienoic acid N-([2S]-2-methylbutyl)amide, 2E,4E-decadienoic acid N-([2R]-2-methylbutylamide), 2E,4Z-decadienoic acid N-(2-methylbutyl)amide, 2E,4E-decadienoic acid N-piperide (achilleamide), 2E,4E-decadienoic acid N-piperide (sarmentine), 2E-decenoic acid N-isobutylamide, 3E-decenoic acid N-isobutylamide, 3E-nonenoic acid N-isobutylamide, 2E,6Z,8E-decatrienoic acid N-isobutylamide (spilanthol), 2E,6Z,8E-decatrienoic acid N-([2S]-2-methylbutyl)amide (homospilanthol), 2E,6Z,8E-decatrienoic acid N-([2R]-2-methylbutyl)amide, 2E-decen-4-ynoic acid N-isobutylamide, 2Z-decen-4-ynoic acid N-isobutylamide, sanshool.

Especially preferred is a preparation according to the invention, wherein the ratio number of intact core-shell-particles to the total number of core-shell-particles is at least 0.7, preferably at least 0.8, more preferably at least 0.9.

The more intact core-shell-particles are comprised in the preparation according to the invention of the better those core-shell-particles can fulfil their function in a controlled way. As mentioned above it is made possible by the invention that there are made core-shell-particles with shells from non-animal origin of a high hardness (stress resistance) so that the number of intact particles within preparations can be advantageously high.

Further preferred embodiments of the invention are described in the claims. The following examples are intended for illustration purposes but are not intended to narrow the invention.

EXAMPLE 1

Capsules according to the invention were prepared by using the ingredients in table 1, wherein E1-E3 are examples according to the invention and C1 to C5 are comparative examples. The shell solution was prepared by dissolving the water soluble ingredients as well as dispersing the silicone dioxide in the drinking water using a high shear mixing equipment (Ultra Turrax). The shell solution and the core liquid were feed to a vibrating two fluid nozzle where droplets of a core liquid completely surrounded by a liquid shell solution were formed and dripped into the gelling bath. After gelling the capsules were washed with water and transferred into a fluid bed equipment. Additional silicone dioxide is added as anti caking agent and the capsules are dried to 5% water content.

The breaking strength of the dried capsule was determinated using a Texture analyser TA-XT-2. Capsule size of the dried capsule was 1 mm.

The parameters of the measurement are as follows:

| Mode: | Measure Force in Compression |
|---|---|
| Option: | Return to Start |
| Pre-Test Speed: | 1.0 mm/s |
| Test Speed: | 2.0 mm/s |
| Post-Test Speed: | 10.0 mm/s |
| Distance: | 0.3 mm to bottom |
| Trigger Type: | Auto - 5 g |
| Data Acquisition Rate: | 400 pps |
| Probe | 35 mm cylinder probe |
| Detector | 5 kg load cell |

TABLE 1

| Ingredients shell solution [weight-%] | E1 [weight-%] | E2 [weight-%] | E3 [weight-%] | C1 [weight-%] | C2 [weight-%] | C3 [weight-%] | C4 [weight-%] |
|---|---|---|---|---|---|---|---|
| drinking water | 89.9985 | 89.9985 | 89.9985 | 90.6485 | 90.6485 | 90.6485 | 90.6485 |
| glycerol | | | | | | | 6.0000 |
| sorbitol | 6.0000 | | | 6.0000 | | | |
| xylitol | | 6.0000 | | | 6.0000 | | |
| isomalt | | | 6.0000 | | | 6.0000 | |
| sodium alginate | 1.5000 | 1.5000 | 1.5000 | 1.5000 | 1.5000 | 1.5000 | 1.5000 |
| sodium alginate | 1.5000 | 1.5000 | 1.5000 | 1.5000 | 1.5000 | 1.5000 | 1.5000 |
| Aerosil 200 (silicone dioxide) | 0.6500 | 0.6500 | 0.6500 | | | | |
| trinatriumcitrate | 0.3500 | 0.3500 | 0.3500 | 0.3500 | 0.3500 | 0.3500 | 0.3500 |
| Blue No. 1 | 0.0015 | 0.0015 | 0.0015 | 0.0015 | 0.0015 | 0.0015 | 0.0015 |
| Ingredients core liquid | | | | | | | |
| mint flavor | 100.0000 | 100.0000 | 100.0000 | 100.0000 | 100.0000 | 100.0000 | 100.0000 |
| Ingredients gelling bath | | | | | | | |
| drinking water | 88.9850 | 88.9850 | 88.9850 | 88.9850 | 88.9850 | 88.9850 | 88.9850 |
| glycerol | | | | | | | |
| sorbitol | 6.0000 | | | 6.0000 | | | |
| xylitol | | 6.0000 | | | 6.0000 | | |
| isomalt | | | 6.0000 | | | 6.0000 | 6.0000 |
| calciumchloride | 5.0000 | 5.0000 | 5.0000 | 5.0000 | 5.0000 | 5.0000 | 5.0000 |
| Blue No. 1 | 0.0150 | 0.0150 | 0.0150 | 0.0150 | 0.0150 | 0.0150 | 0.0150 |
| breaking force of dried capsules [N] | 4.7 | 4.5 | 4.5 | 2.3 | 2.0 | 2.1 | 1.7 |

EXAMPLE 2

| | E4 [weight-%] | E5 [weight-%] | E6 [weight-%] | E7 [weight-%] | E8 [weight-%] | E9 [weight-%] | E10 [weight-%] | E11 [weight-%] | E12 [weight-%] |
|---|---|---|---|---|---|---|---|---|---|
| Ingredients shell solution [weight-%] | | | | | | | | | |
| drinking water | 89.7200 | 89.5500 | 89.5500 | 89.7200 | 89.700 | 89.1500 | 89.7500 | 89.7485 | 89.7485 |
| Sorbitol | 6.0000 | | | 6.0000 | 6.0000 | 6.0000 | 6.0000 | 6.0000 | 6.0000 |
| Xylitol | | 6.0000 | | | | | | | |
| Isomalt | | | 6.0000 | | | | | | |
| sodium alginate | 1.5000 | 1.5000 | 1.5000 | 1.5000 | 1.5000 | 1.5000 | 1.5000 | 1.5000 | 1.5000 |
| sodium alginate | 1.5000 | 1.5000 | 1.5000 | 1.5000 | 1.5000 | 1.5000 | 1.5000 | 1.5000 | 1.5000 |
| Aerosil 200 (silicone dioxide) | 0.6500 | 0.6500 | 0.6500 | 0.6500 | 0.6500 | 0.6500 | 0.6500 | 0.6500 | 0.6500 |
| trinatriumcitrate | 0.3500 | 0.3500 | 0.3500 | 0.3500 | 0.3500 | 0.3500 | 0.3500 | 0.3500 | 0.3500 |
| Blue No. 1 | | | | | | | | 0.0015 | 0.0015 |
| $Fe_2O_3$ | 0.0300 | 0.1000 | | | | | | | |
| FeO(OH) | | | 0.3000 | 0.0300 | | | | | |
| caramel color | | | | | 0.05 | | | | |
| anthocyanins from blueberry | | | | | | 0.1 | | | |
| Polysorbat 80 | 0.2500 | 0.35 | 0.15 | | | 0.25 | 0.25 | 0.25 | 0.25 |
| Polysorbat 20 | | | | 0.25 | | | | | |
| mono- and diglycerides of fatty acids | | | | | 0.25 | | | | |
| Ascorbic acid | | | | | | 0.5 | | | |
| Ingredients core liquid | | | | | | | | | |
| Cherry flavor | 19.75 | | | | | | | | |
| Strawberry flavor | | 90 | | | | | | | |
| orange flavor | | | 75 | | | | | | |
| vanilla flavor | | | | 30 | | | | | |
| chocolate flavor | | | | | 10 | | | | |
| berry flavor | | | | | | 50 | | | |
| onion flavor | | | | | | | 1 | | |
| menthol | | | | | | | | 100 | |
| wintergreen flavor | | | | | | | | | 100 |
| vegetable oil | 80 | 10 | 25 | 70 | 90 | 50 | 99 | | |
| Polysorbat 80 | 0.25 | | | | | | | | |
| Ingredients gelling bath | | | | | | | | | |
| drinking water | 90.7500 | 88.6500 | 88.8500 | 88.7500 | 88.700 | 83.4000 | 89.0000 | 88.9985 | 88.9985 |
| Sorbitol | 6.0000 | | | 6.0000 | 6.0000 | 6.0000 | 6.0000 | 6.0000 | 6.0000 |

-continued

| | E4 [weight-%] | E5 [weight-%] | E6 [weight-%] | E7 [weight-%] | E8 [weight-%] | E9 [weight-%] | E10 [weight-%] | E11 [weight-%] | E12 [weight-%] |
|---|---|---|---|---|---|---|---|---|---|
| Xylitol | | 6.0000 | | | | | | | |
| Isomalt | | | 6.0000 | | | | | | |
| calciumchloride | 3.0000 | 5.0000 | 5.0000 | 5.0000 | 5.0000 | 10.000 | 5.0000 | 5.0000 | 5.0000 |
| Blue No. 1 | | | | | | | | 0.0015 | 0.0015 |
| caramel color | | | | | 0.05 | | | | |
| anthocyanins from blueberry | | | | | | 0.1 | | | |
| Polysorbat 80 | 0.2500 | 0.35 | 0.15 | | | | | | |
| Polysorbat 20 | | | | 0.25 | | | | | |
| mono- and diglycerides of fatty acids | | | | | 0.25 | | | | |
| Ascorbic acid | | | | | | 0.5 | | | |

EXAMPLE F1

Chewing Gum with Capsules According to the Invention

The chewing gum base K2 consists of 28.5% terpene resin, 33.9% polyvinyl acetate (MW=14.000), 16.25% hydrogenated vegetable oil, 5.5% mono- and diglyceride, 0.5% polyisobutene (MW 75,000), 2.0% butyl rubber (isobutene-isoprene copolymer), 4.6% amorphous silicon dioxide (water content approximately 2.5%), 0.05% antioxidant tert.-butylhydroxytoluol (BHT), 0.2% lecithin and 8.5% calcium carbonate. The production of the chewing gum base can be performed in the same way as in U.S. Pat. No. 6,986,907.

| | Formulation I (Wt %) | Formulation II (Wt %) | Formulation III (Wt %) |
|---|---|---|---|
| Chewing gum base K2 | 25.30 | 27.30 | 26.30 |
| Sorbitol | To 100 | To 100 | To 100 |
| Glycerine | 2.40 | 2.40 | 2.40 |
| Lecithin | 7.00 | 7.00 | 7.00 |
| Aspartame | 0.14 | 0.14 | 0.14 |
| Encapsulated aspartame | 0.68 | 0.68 | 0.48 |
| Menthol, spray-dried | 1.00 | 0.50 | 0.40 |
| Cherry flavoring, spray-dried | — | 1.20 | — |
| Capsules according to the invention from example E1 | 1.45 | — | 0.50 |
| Capsules according to the invention from example E2 | — | 1.15 | 0.50 |

The chewing gums of formulation (I) are formed as strips with a thickness of 1.6 mm and those of formulations (II) and (III) as pellets.

EXAMPLE F2

Sugar-Free Hard Caramels with Capsules According to the Invention

| Ingredient | A (Wt %) | B (Wt %) |
|---|---|---|
| Palatinite, type M | To 100 | To 100 |
| Water | 24.82 | 24.82 |
| Peppermint flavoring | 0.15 | 0.05 |
| Orange flavoring | — | 0.10 |
| Hesperetin | — | 0.01 |
| Spilanthol | — | 0.01 |
| Trans-pellitorin | 0.01 | — |
| Capsules according to the invention from example E4 | 0.75 | 1.00 |

Palatinite is mixed with water and the mixture is melted at 165° C. and then cooled to 115° C. Aroma and flavoring substances according to the invention as well as transpellitorin in case A and spilanthol and hesperetin in case B are added and after thorough mixing casting into moulds takes place and, following solidification, removal from the moulds and then individual packaging.

EXAMPLE F3

Low-Fat Yogurt with Capsules According to the Invention

| | Preparation (details in Wt %) | | |
|---|---|---|---|
| Ingredient | A | B | C |
| Sucrose | 10 | 8 | 6 |
| Tagatose | — | — | 0.5 |
| Fructose | — | — | 0.5 |
| Hesperetin | — | 0.01 | 0.005 |
| Phloretin | — | — | 0.005 |
| Peach flavoring | 0.30 | — | 0.40 |
| Strawberry-rhubarb flavoring | — | 0.25 | — |
| Capsules according to the invention from example E5 | 0.25 | 2.00 | 0.40 |
| Yogurt, 0.1% fat | To 100 | To 100 | To 100 |

The ingredients are mixed and cooled at 5° C.

EXAMPLE F4

Dietetic Chocolate Having a Fructose Base with Capsules According to the Invention A chocolate suitable for diabetics is produced from the following ingredients and cast into rectangular tablets:

cocoa mass, fructose, skimmed milk powder, cocoa butter, inulin, clarified butter, soya lecithin emulsifier, walnuts, table salt, yogurt-vanilla flavoring (containing vanillin and 1 Wt % hesperetin, in relation to the total weight of the vanilla flavoring) and 1 Wt % capsules according to the invention from example E6, in relation to the total weight of the tablets.

Nutritional value (per 100 g):
protein 8.8 g, carbohydrate 34 g (of which fructose 23 g, lactose 7.5 g, sucrose 1.4 g), fat 36 g; dietary fiber 18.5 g (of which 12.2 g inulin); sodium: 0.10 g. Chocolate content minimum 50 Wt %.

EXAMPLE F5

Cereal Mixture with Capsules According to the Invention

| No. | | A (Wt %) | B (Wt %) | C (Wt %) |
|---|---|---|---|---|
| 1 | Rolled oats | 17.00 | 17.00 | 17.00 |
| 2 | Crispy oat flake clusters | 10.00 | 10.00 | 10.00 |
| 3 | Rice Krispies | 16.90 | 16.90 | 16.90 |
| 4 | Cornflakes | 16.50 | 16.50 | 16.50 |
| 5 | Currants | 3.50 | 3.50 | 3.50 |
| 6 | Hazelnuts, chopped | 2.50 | 2.50 | 2.50 |
| 7 | Glucose syrup from wheat, DE 30 | 9.50 | 9.50 | 9.50 |
| 8 | Sucrose | 19.00 | 19.00 | 19.00 |
| 9 | Water | 4.00 | 4.00 | 4.00 |
| 10 | Powdered citric acid, anhydrous | 0.10 | 0.10 | 0.10 |
| 11 | Capsules according to the invention from example E7 | 1.00 | — | 0.50 |
| 12 | Capsules according to the invention from example E8 | — | 1.00 | 0.50 |

Constituents No.'s 1 to 6 are mixed in a rotary drum (Mix 1). Constituents No.'s 7 to 9 are heated and constituents No.'s 10 to 12 are added (Mix 2). Mix 2 is added to Mix 1 and mixed well. Finally the resulting cereal mixture is placed on a baking sheet and dried in an oven at 130° C. for 8 minutes.

EXAMPLE F6

Fruit Gums with Capsules According to the Invention

| Ingredients: | A (Wt %) | B (Wt %) |
|---|---|---|
| Water | 22.70 | 24.70 |
| Sucrose | 34.50 | 8.20 |
| Glucose syrup, DE 40 | 31.89 | 30.09 |
| Iso Syrup C* Tru Sweet 01750 (Cerestar GmbH) | 1.50 | 2.10 |
| Gelatin 240 Bloom | 8.20 | 9.40 |
| Polydextrose (Litesse ® Ultra, Danisco Cultor GmbH) | — | 24.40 |
| Yellow and red coloring | 0.01 | 0.01 |
| Citric acid | 0.20 | 0.10 |
| Orange flavoring | — | 0.10 |
| Capsules according to the invention from example E9 | 1.0 | 0.90 |

EXAMPLE F7

Chewing Candy with Capsules According to the Invention

List of Ingredients:

| Water | | 7.7 wt.-% |
|---|---|---|
| Sugar | Raffinade C4 | 41.0 wt.-% |
| Glucose syrup | Dextrose 40 | 37.3 wt.-% |
| Hardened vegetable fat | Melting point 32-36° C. | 6.6 wt.-% |
| Lecithin | Emulsifier (Soya lecithin) | 0.3 wt.-% |
| Gelatin | Pork gelatin | 0.8 wt.-% |
| Fondant | Type - S30 | 4.9 wt.-% |
| capsules according to the invention from example E4 | | 1.4 wt.-% |

EXAMPLE F8

Fruit Muesli Bar with Capsules According to the Invention

List of Ingredients:

| Sucrose | Sugar | 17.0 wt.-% |
|---|---|---|
| Dextrose 40 | Glucose syrup | 14.7 wt.-% |
| Sorbit P 300 | Humectant | 5.0 wt.-% |
| Vegetable fat | Melting point 37° C. | 5.0 wt.-% |
| Water | | 3.0 wt.-% |
| Rolled oats | | 13.3 wt.-% |
| Oat flakes | Oat extrudate | 10.0 wt.-% |
| Cornflakes | | 5.5 wt.-% |
| Rice Krispies | Rice extrudate | 20.0 wt.-% |
| Currants | | 5.0 wt.-% |
| capsules according to the invention from example E5 | | 1.3 wt.-% |
| Citric acid, powder | | 0.2% |

EXAMPLE F9

Waffle Fatty Filling with Capsules According to the Invention

List of Ingredients:

| Vegetable hard fat | Melting point 33-35° C. | 42.2 wt.-% |
|---|---|---|
| Sugar powder | | 37.0 wt.-% |
| Dextrose | Dextrose, anhydrous, micro-fine | 19.0 wt.-% |
| Citric acid | | 0.3 wt.-% |
| capsules according to the invention from example E7 | | 1.5 wt.-% |

Production instructions: Bring the fat to ambient temperature of approximately 21° C. Finely sieve the sugar powder. Beat all the ingredients, including flavoring, in a Hobart laboratory mixer.

EXAMPLE F10

Madeira Cake with Capsules According to the Invention

List of Ingredients/Basic Recipe for Madeira Cake:

| Wheat flour | Type 405 | 15.41 wt.-% |
|---|---|---|
| Wheat starch | | 4.40 wt.-% |
| Sucrose | Sugar, EC Grade I | 19.20 wt.-% |
| Cooking salt | | 0.14 wt.-% |
| Potato flour | | 6.22 wt.-% |
| Egg yolk solids | | 1.84 wt.-% |
| Baking powder | | 0.70 wt.-% |
| Beating emulsifier | Mono-diglyceride | 1.42 wt.-% |
| Water | | 18.85 wt.-% |

-continued

| | | |
|---|---|---|
| Pure fat | Melting point approximately 34° C. | 13.89 wt.-% |
| Eggs | | 16.02 wt.-% |
| Beta-carotene 1% solution | | 1.41 wt.-% |
| capsules according to the invention from example E7 | | 0.5 wt.-% |

Production Instructions:
Bring the fat to temperature. Place all dry matter, including the encapsulation product according to the invention, in the mixing bowl of the Hobart laboratory mixer. Then add the pure fat, water and eggs and beat for 1 minute at level 1 and 2 minutes at level 3. Place the dough in a baking tin and bake for 55 minutes at 180° C.

EXAMPLE F11

Short Pastry Biscuits (Industrial Quality) with Capsules According to the Invention List of Ingredients:

| | | |
|---|---|---|
| Wheat flour | Type 550 | 52.60 wt.-% |
| Soft vegetable fat | Melting point 24/26° C. | 19.0 wt.-% |
| Sugar powder | | 19.0 wt.-% |
| Salt | | 0.4 wt.-% |
| Ammonium bicarbonate | Leavening | 0.4 wt.-% |
| Skimmed milk powder | | 1.0 wt.-% |
| Maltose syrup | DE 60.5 | 1.2 wt.-% |
| Water | | 5.50 wt.-% |
| capsules according to the invention from example E7 | | 0.9 wt.-% |

Production Instructions:
a) Allow the sugar powder, maltose syrup, skimmed milk powder and soft vegetable fat to run smooth in the Hobart laboratory kneader at level 1.
b) Using some of the water to dissolve the ammonium bicarbonate and add the remaining water to the mixture from a) and mix briefly.
c) Add the remaining ingredients with the capsules from example E7 to mixture a) and work into a smooth dough.
d) Roll out the dough with the rolling machine to a thickness of approximately 3 mm, mark out a sample possibly using a wooden cutter, and cut out in the desired shape.
Final thickness of the dough: approximately 2.6 mm; oven temperature: 200° C., baking time: 6 minutes.

EXAMPLE F12

Snack Item with Capsules According to the Invention

Example Recipe for the Production of Crackers:
wheat flour (60-63 wt.-%), baking powder (1.0-1.5 wt.-%), vegetable fat (6.0-6.5 wt.-%), maltose syrup (2.0-2.5 wt.-%), emulsifier (1.2-1.8 wt.-%), ammonium bicarbonate (1.5-2.0 wt.-%), spray-process skimmed milk powder (1.0-1.5 wt.-%), fresh baker's yeast (0.3-0.9 wt.-%), table salt (0.3-0.6 wt.-%), water (20.0-23.5 wt.-%), capsules according to the invention (approximately 0.3 wt.-%), here capsules according to example E10. All wt.-% are related to the total weight of all mixed ingredients.
The crackers are baked or deep-fried following the mixing of the ingredients.

The invention claimed is:
1. A spherical core-shell-particle comprising:
(a) a core comprising:
(a1) a core liquid;
(b) a hardened shell surrounding the core, wherein the hardened shell comprises:
(b1) a hardened polysaccharide, or a mixture of hardened polysaccharides,
(b2) at least one water soluble filler selected from the group consisting of: sorbitol, mannitol, xylitol, erythritol, maltitol, isomalt and lactitol, and
(b3) a hardness increasing amount of at least one water insoluble filler; and, optionally,
(c) a coating layer.
2. The core-shell-particle according to claim 1, wherein the hardened shell is seamless, or the core is mononuclear.
3. The core-shell-particle according to claim 1, wherein the hardened polysaccharide, or the mixture of hardened polysaccharides of component (b1)
is selected from the group consisting of hardened alginates, pectines, xanthan gum, carrageen, agar-agar, and hardened mixtures thereof; and
wherein the at least one water insoluble filler of component (b3) is selected from the group consisting of silicon dioxide, calcium phosphates, cellulose, titanium dioxide, iron(III) oxide-hydroxide, $FeO(OH) \cdot H_2O$, iron(III) oxide, iron(II,III) oxide, magnesium phosphates, aluminium hydroxide, aluminium silicate, magnesium silicate, hydrated magnesium silicate $H_2Mg_3(SiO_3)_4$ or $Mg_3Si_4O_{10}(OH)_2$, magnesium trisilicate, magnesium aluminium silicate, sodium aluminium silicate, potassium aluminium silicate, calcium aluminium silicate, and bentonite.
4. The core-shell-particle according to claim 1, wherein
the at least one water insoluble filler of component (b3) consists of particles having an average particle size of ≤100 μm; or
the particles of the at least one water insoluble filler of component (b3) are dispersed homogeneously within the shell.
5. The core-shell-particle according to claim 4, wherein the particles of the at least one water insoluble filler of component (b3) are dispersed homogeneously within the shell and have an average particle size of 5-20 nm.
6. The core-shell-particle according to claim 1, wherein a ratio of the total weights of components (b1):(b2):(b3) is in a range from 1:0.1:0.1 to 1:0.5:0.5.
7. The core-shell-particle according to claim 1, wherein component (b) further comprises at least one additive selected from the group consisting of emulsifiers, colourings, antioxidants, sweeteners, and neutraceuticals.
8. The core-shell-particle according to claim 1, wherein component
(a) comprises at least one substance selected from the group consisting of flavors, fragrances, solvents, and sweeteners,
and optionally comprises at least one substance selected from the group consisting of coloring agents, vitamins, vegetable extracts, thickening agents, weightening agents, pH-modifiers, antioxidants, emulsifiers, neutraceuticals and microorganisms.
9. The core-shell-particle according to claim 1, wherein a breaking force of the core-shell-particle is 2.5 N or more.
10. A preparation comprising a plurality of the core-shell-particles according to claim 1.
11. A preparation according to claim 10, wherein the preparation is selected from the group consisting of food preparations, cosmetic preparations, cleaning preparations, and air refreshener preparations.

12. A preparation according to claim 10, wherein a ratio of the number of intact core-shell-particles in said preparation to a total number of core-shell-particles in said preparation is at least 0.7.

13. The core-shell-particle according to claim 1, wherein the at least one water soluble filler is selected from the group consisting of sorbitol, xylitol, and isomalt.

14. The core-shell-particle according to claim 13, wherein the at least one water insoluble filler of component (b3) comprises silicon dioxide.

15. The core-shell-particle according to claim 13, wherein the at least one water insoluble filler of component (b3) consists essentially of silicon dioxide.

16. The core-shell-particle according to claim 1, wherein the at least one water insoluble filler of component (b3) comprises silicon dioxide.

* * * * *